Dec. 23, 1969 R. K. ILER 3,485,658
PLURAL MONOLAYER COATED ARTICLE AND PROCESS OF MAKING
Filed July 22, 1965
FIG. 1
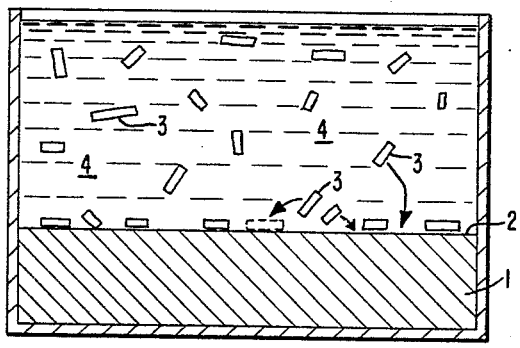
FIG. 2
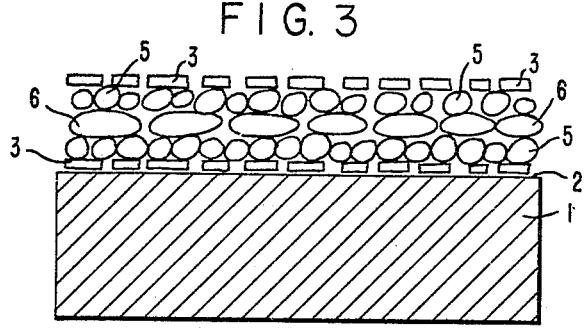
FIG. 3
INVENTOR
RALPH K. ILER
BY Fred E. Carlson
ATTORNEY United States Patent Office 3,485,658
Patented Dec. 23, 1969

3,485,658
PLURAL MONOLAYER COATED ARTICLE AND
PROCESS OF MAKING
Ralph K. Iler, Wilmington, Del., assignor to E. I. du
Pont de Nemours and Company, Wilmington, Del., a
corporation of Delaware
Continuation-in-part of application Ser. No. 160,223,
Dec. 18, 1961. This application July 22, 1965, Ser.
No. 477,635
Int. Cl. C03c *17/00;* B44d *1/14*
U.S. Cl. 117—69                            25 Claims

ABSTRACT OF THE DISCLOSURE

This invention concerns novel coated articles. These articles comprise a solid-state substrate having on its surface a coating of at least 3 monolayers of colloidal solid state particles. The particles in each monolayer are alike. However, the particles initially comprising each monolayer are different from the particles in an adjacent monolayer.

---

This application is a continuation-in-part of application Ser. No. 160,223, filed Dec. 18, 1961, now abandoned.

This invention relates to articles coated with a multiplicity of monolayers of colloidal particles and to processes for their production, and is more particularly directed to such articles comprising a solid-state substrate to a surface of which there is joined a coating comprising at least three monolayers of colloidal, solid-state particles, the colloidal particles comprising each monolayer being alike and being different from the colloidal particles in an adjacent monolayer, and to processes for making such articles, said processes comprising the steps of:

(1) effecting contact between the surface of the substrate and a first dispersion of colloidal particles which are irreversibly adsorbable on the substrate, the number of particles in the dispersion being at least sufficient to cover the surface, whereby the surface is coated with a single layer of the particles, (2) rinsing off any excess dispersion, (3) effecting contact between the so-coated surface and a second dispersion of colloidal particles different from the first particles which second particles are irreversibly adsorbable on said coated surface, the number of particles in the dispersion being at least sufficient to cover the coated surface, whereby said surface is coated with a single layer of the second particles, (4) rinsing off any excess of the second dispersion of colloidal particles, (5) effecting contact between the product of step (4) and a third dispersion of colloidal particles different from the second particles, said third particles being irreversibly adsorbable on the monolayer of second particles, the number of particles in the dispersion being at least sufficient to cover the coated surface from step (4), whereby the said surface is coated with a single layer of the third particles, and (6) rinsing off any excess of the third dispersion.

In the drawings:

FIGURE 1 illustrates a process of the invention wherein there is a substrate 1 having a surface 2 upon which there is being laid down and irreversibly joined a layer of colloidal particles 3 from a dispersion thereof in a continuous dispersion medium 4, and FIGURE 2 illustrates an article of the invention in cross section in which there is a substrate 1 having a surface 2 upon which there is a first monolayer of colloidal particles 3, a second monolayer of colloidal particles 5, and a third monolayer of colloidal particles 6, the monolayers being cut away to show their manner of deposition, and FIGURE 3 represents a similar article of the invention having additional monolayers of colloidal particles 5 and 3, the colloidal particles in each monolayer being alike and being different from the colloidal particles in an adjacent monolayer.

The drawings are not to scale; rather, certain aspects have been purposely exaggerated to illustrate the invention more clearly. It will be understood that in all cases the particles shown are of colloidal dimensions—that is, at least one dimension of the particles is 500 millimicrons or less. Moreover, in the dispersion of FIGURE 1 only a few of the particles are shown and it will be understood that the concentration of particles will be in fact very much greater than illustrated. Also, the size of the colloidal particles in the various monolayer coatings of FIGURES 2 and 3 is shown as much larger in proportion to the thickness of the substrate than would normally be the case, and it will be understood that the substrate may have any desired thickness and shape.

Methods for depositing very thin films of solid materials on the surface of substrates are already known. There are numerous high-vacuum vaporization techniques for doing this, whereby layers of various oxides and metals less than 1 micron in thickness have been deposited. But it is very difficult to obtain a deposit of uniform thickness over the whole area of the treated substrate by those methods and control of the absolute thickness of the applied film is likewise difficult, since the thickness of the applied film depends on the rate of deposition from the vapor phase, which in turn calls for extremely careful control of the total amount of substance being vaporized and the length of time the coating process is continued. Furthermore, by the vaporizing process it is not possible to apply many types of coating materials, particularly extremely thin layers of solid organic material.

The known methods of coating are especially unsatisfactory when it is desired to apply a plurality of thin, uniform layers of materials, each layer of which is about 0.1 micron or less in thickness. It is, of course, possible to deposit such coatings along with a carrier material, such as lacquer, which remains a part of the film laid down. The present invention is not concerned with any such films, but rather with coatings which consist substantially entirely of discrete colloidal particles and the properties of which are hence dependent only upon the nature of the colloidal particles employed.

The multi-monolayer coatings of the present invention are not to be confused with coatings consisting of single or multiple layers of a single type of colloidal particles. Unique properties and hence novel utilities are attributable to the multi-monolayer arrangement. For many purposes, a coating consisting of only two layers of colloidal particles is unsatisfactory. For example, where the coating is to be used as a very thin electrically insulating film, there are invariably many spots on the surface, due to impurities, dust particles, mechanical damage, etc., which make a film of one or two layers so imperfect as to be useless. By applying multiple layers, on the other hand, imperfections which occur in one layer are cover over by subsequent layers. Even though there may be imperfections in every layer, these are seldom super-imposed, so that by applying multiple coatings a continuous, although still extremely thin, insulating film can be developed.

Having more than two layers of particles is also very desirable in creating color-interference films on nonporous smooth surfaces such as glass, porcelain, high alumina ceramics, and organic films, as well as metals since these must be of accurately controlled thickness in order to develop the desired color. The thickness of color films must, in general, be at least equal to a quarter of the wave length of visible light—that is, at least of the order of 0.1μ. At the same time, it is desirable to control the thickness of the film within 10 millimicrons in order to develop a good color. It is very difficult to make uniform colloidal particles with sufficiently accurate control of particle diameter to give a reproducible color from batch to batch when particles of the order of 100 millimicrons have to be employed. On the other hand, by employing much smaller particles—for example, in the range from 10 to 30 millimicrons in diameter—it is possible to build up multilayer films which are of the order of 100 to 200 millimicrons in thickness, and to control the thickness within 10 millimicrons by applying the correct number of layers of colloidal particles.

There are, furthermore, potential electrical applications for multiple layers of colloidal particles, in which the application of only two layers would be inadequate and indeed unworkable.

Now according to the present invention it has been found that the above-mentioned problems of the prior art can be overcome and that substrates having coatings of extremely accurately controlled thickness can be made by processes in which a monolayer of colloidal particles, adsorbable on the substrate, is first laid down on the substrate from a dispersion of said particles, dispersion in excess of said monolayer is rinsed off, a monolayer of different colloidal particles, adsorbable on the first monolayer is then laid down from a second dispersion and the excess is rinsed off and the process is repeated, each time using colloidal particles different from the last layer, until the desired thickness of coating is built up.

THE SUBSTRATE

In an article of the invention the substrate is an object in the solid state—that is, it is a solid as distinguished from a liquid or gas, but it can be a substance commonly referred to as "plastic" which will flow under a definite, applied stress. In one embodiment it can be a refractory material in the sense that it is not easily decomposable by heat, but it will be understood that "refractory" does not necessarily imply a high-temperature refractory which will withstand extremely high temperatures. In the most useful embodiments of the novel articles the substrate will have a melting point above about 500° C.

The substrate must have a coatable surface, but the shape and form of the substrate is immaterial. The substrate may be in the form of such diverse shapes as film, sheet, fiber, plate, or other massive, irregularly shaped objects. It may be dense or porous. If porous, the pores may even be smaller than the coating particles, in which event only the surface of the object will be coated; whereas if the pores are larger than the coating particles, the interior surfaces of the pores will be coated.

Composition-wise, the substrate can be glass, ceramics, metals, or synthetic or naturally occurring polymers such as polyfluoroethylene or regenerated cellulose.

For facility in operating the coating process, the substrate should be one which can be wetted by the dispersion of colloidal particles to be applied. Ordinarily, however, the dispersion medium will be adapted to the substrate to be coated, rather than vice versa. Similarly, the substrate should be one which attracts the colloidal particles of the first dispersion applied, although again the coating dispersion will ordinarily be selected with reference to the substrate to be coated rather than vice versa.

Porous substrates can be used provided that in the treating process precautions are observed to reach equilibrium in the coating and rinsing steps. Thus, for example, a highly porous alpha alumina catalyst support having pores larger than 1 micron in diameter can suitably be employed. In this case, alternate layers of metal oxides and silica, for instance, may be deposited over the whole surface of the catalyst support including the interior surface of the pores. In rinsing out the excess colloidal solution sufficient time must be permitted for the unadsorbed colloidal particles to diffuse out; otherwise, uniform, single layers of particles will not be formed but, instead, irregular deposits particles in addition to the first-bound, single adsorbed layer will be present.

Obviously, the substrate must be one which is insoluble in the dispersion medium of the coating dispersion, but again, the dispersion medium is usually selected with reference to the substrate involved rather than vice versa.

As will be more fully explained below, the capability of the substrate to acquire a characteristic electrical charge in the presence of the dispersion medium of the coating solution probably explains its ability to absorb the colloidal particles from the coating solution. Most water-wettable substrates, whether organic or inorganic, have negatively charged surfaces. Typical examples are glass, cellophane, mica, vitreous enamel, and films of hydrophilic polymers containing such acidic groups as carboxylic groups. Some organic polymer surfaces which are difficult to wet may be treated with solutions of sodium hydroxide or oxidizing agents to improve wettability and to develop some ionic groups on the surface.

Other substrates may be positively charged, for instance, sapphire or corundum, or zirconium oxide or titanium oxide ceramic surfaces. With some oxides it is necessary to treat the surface with a metal salt corresponding to the metal oxide coating to develop a positive charge. Fused aluminum oxide, for example, develops a positive charge when treated with a small amount of aluminum nitrate in solution. On the other hand, when the coating dispersion is a sol of colloidal alumina it will ordinarily contain sufficient aluminum ions to interact with the surface of sapphire, corundum, or alpha alumina to develop a positive charge on the surface.

Some substrate surfaces are of a nature which is difficult to characterize. For instance, polyethylene film has a highly hydrophobic surface, is difficult to wet with aqueous solutions, and is essentially non-ionic in nature. Where such inert surfaces are to be employed as substrates they should first be modified by techniques known to the art such as by mild oxidation treatment, or in the case of certain polyester films, by treatment with sodium hydroxide to liberate some acidic groups on the surface. Alternatively, it may be desirable to pretreat such inert substrate surfaces by "sputtering" or deposition of a metal or metal oxide film in high vacuum to deposit very thin surface layers to which either positively or negatively charged colloidal particles in aqueous solution will then adhere.

Organic substrates containing basic groups are usually positively charged when in contact with water below pH 6. Polymeric amines, urea-formaldehyde resins, and melamine-formaldehyde resins, especially when the surface has been freshly abraded in contact with dilute acid exhibit a positive charge. Certain textile finishes and anti-static agents consist of high molecular weight organic polymers containing secondary or tertiary amine groups or quaternary ammonium ions. Such treated textiles are suitable substrates for the practice of the present invention.

More commonly, the surfaces of hydrophilc polymeric organic materials are negatively charged. Cotton, paper or regenerated cellulose film usually contains enough carboxylic acid groups, possibly from oxidation of —$CH_2OH$ groups, or terminal aldehydic groups, to provide anionic, negatively charged sites at the surface. Treatment of the surface of cellulose with an oxidizing agent such as dilute chromic acid or alkaline potassium permanganate will generate additional acidic sites. Polyester-type fibers and films made by esterification of terephthalic acid with ethylene glycol, are ordinarily very hydrophobic. Brief treatment of the surface with hot, concentrated caustic solution, followed by washing, improves wettability with water and creates some carboxylic acid end groups on the surface, thus providing negatively charged sites. Cellulose acetate and other cellulose ester plastics usually require similar hydrolysis or oxidation treatments to prepare the surface for use as a substrate in this invention, and it will be apparent to one skilled in the art of organic chemistry how to hydrophilize the surfaces of other synthetic organic polymers.

Generally speaking, conventional wetting agents or surfactants should not be employed for making hydrophobic surfaces hydrophilic in the process of this invention. Such wetting is achieved by the adsorption of the surfactant molecules on the surface of the substrate. The adsorbed molecules are in equilibrium with surfactant in solution, so that when the substrate is rinsed the adsorbed surfactant is removed and the surface becomes hydrophobic.

Among inorganic substrates which are negatively charged are most silicate and aluminosilicate minerals, especially after they have been washed with acid solution. Clays such as kaolin, mica, talc, or asbestos such as chrysotile, amocite or crocidolite, can be used as substrates.

It will be noted that when finely divided materials are employed as substrates, it will be necessary to use only the finest colloidal particles for the coatings. Such coatings may be observed under the electron microscope, if the substrate is thin enough. By applying thin coatings of colloidal particles to the surfaces of platelets of kaolin, for example, it is possible to achieve extremely even distribution of the colloidal components with the kaolin. When the clay is dried, the individual platelets of clay remain separated from each other by the mutiple monolayers of such colloidal particles as alternate layers of colloidal silica and colloidal alumina. These compositions can be molded and fired to unusually homogeneous ceramic bodies.

While the coating of colloidal particles onto other larger, but still finely divided, particles is one aspect of this invention, it should be understood that substrates which are macroscopic in size will most commonly be employed. Thus, glass in the form of plates, sheets, rods or fibers is a preferred substrate. Glass fibers can be coated by the process of this invention and the application of protective layers of colloidal particles to freshly spun fibers improves the strength and durability, especially after multiple monolayers of silica and alumina have been fixed in place by heat treatment just below the melting point of the glass.

Positively charged, inorganic substrates are typified by metals such as iron, nickel, platinum, cobalt, copper, zinc, aluminum, lead, titanium and tin. Each of these metals, when clean and in contact with air, bears on its surface a thin film of the corresponding metal oxide which, in contact with water, bears a positive charge. It is obvious that this charge will disappear if the pH is too low, since for every metal oxide there is a pH below which the oxide begins to dissolve. For this reason iron ceases to be a suitable substrate if the acidity of the solution is increased to the point where the iron oxide film is removed and hydrogen is evolved from the surface.

In such cases as iron, zinc, nickel, cobalt and tin, where the metal is easily attacked by acid, it is often preferable to convert the surface to an insoluble silicate by immersing the metal substrate in a dilute solution of sodium silicate such as one containing 3.3% $SiO_2$ and 1.0% equivalent $Na_2O$ and heating the solution for ten minutes. When excess silicate solution is rinsed off, it is found that the surface is covered with a thin film of metal silicate and silica and that the substrate can now be treated as though it were silica. Similar pretreatment of metal surfaces with phosphates, chromates, arsenates or molybdates can be used in certain instances to create thin films which can then be used as a substrate in an article of this invention.

Metal with a coating of vitreous enamel can be employed as a substrate; in this case, the coating, being a glass, will usually be found to be negatively charged in aqueous solution.

The substrate employed can be used only as a temporary support for the film. Thus, for example, multiple monolayers of 30-millimicron colloidal silica and 5-millimicron diameter fibrillar colloidal boehmite alumina, were deposited on aluminum foil which was initially wetted with a dilute solution of sodium silicate. The layers were built up to a thickness sufficient to show a red interference color when examined at a low angle. The coated aluminum foil was then heated for five minutes at 500° C. and then immersed in dilute nitric acid for twenty-four hours. The aluminum metal had dissolved and the solution contained in suspension thin, highly colored, iridescent films of the colloidal coating which was not destroyed by the acid. Similary formed colloidal films made with colloidal titania and colloidal silica can be employed as a decorative pigment, giving a mother-of-pearl effect.

THE COATING

The coating upon the substrate is an article of this invention consists of at least three monolayers of particles. By "monolayer" is meant that the layer is one particle thick, the layer thus being made up of substantially contiguous particles in a single plane. It will be understood, of course, that due to surface irregularities in the substrate, foreign particles in the coating dispersion, and for other reasons, there may be imperfections in the monolayer, and in limited areas additional layers of particles may be present; but, in general, each monolayer will be one particle thick. Similarly, the second, third, and additional monolayers will likewise be about one particle thick.

The sequence of layers and their relative thicknesses can be examined by means of the electron microscope by using suitable techniques. To examine the film structure it is preferable to have a thin cross section of the layers. In some cases the substrate can be dissolved away, the layer floated off in solution and then broken up into fragments in a high-speed mixer or by grinding. Then by depositing the suspension of fragments on its prepared screen support used in the electron microscope it is usually possible to find occasional fragments on edge. Another method is to first let the fragment lie flat, then puncture the supporting film by the electron beam so that the base film curls and turns the specimen on edge so the cross section can be observed.

Where the support is rigid, as for example glass, the multiple monolayer coating can be removed by impregnating the coating with a solution of a strong, tough, film-forming organic polymer, drying, and stripping off the film. This does not always remove all the layers but the surface can be examined for residual layers by conventional replica techniques. The stripped film can then be examined by one of several methods. If the coating consists of inorganic particles, the stripped film can be oxidized at 400° C. in air and the fragment of inorganic coating examined by the electron microscope as described above. If organic, it will be necessary to mount the film in plastic, fracture the surface, and examine the surface by replica techniques until a cross section of the original coating is found.

The particles in each monolayer are referred to as "colloidal." This means that they have a size within the range of colloidal dimensions. Colloidal particles have been defined by Weiser, "Colloid Chemistry," 2nd edition, J. Wiley & Sons, New York, 1950, on page 2, as being within the range from 0.5 micron (500 millimicrons) down to 1 millimicron and this is the range contemplated in the present description. It will be understood, of course, that at least one of the three dimensions of the particles in the coating must be within this range; in a preferred aspect two dimensions of the particle will be in this range and in a still more preferred embodiment all of the three dimensions will be.

The tests of colloidal behavior conventionally used will likewise apply to the colloidal particles in the coating. Broadly speaking, it is said that colloidal particles will run through filter paper but not an ultrafilter. They are not resolved in the ordinary light microscope, and usualy recognizable in the ultramicroscope. They are also often recognizable with the electron microscope, particularly where the colloidal particles have a rigid shape. In the case of linear organic molecules, where the unit is highly flexible, it is very difficult to see the ultimate colloidal particles or molecules even with the electron microscope.

Another characteristic of colloidal particles is that they will generally not pass through dialyzing membranes such as films of regenerated cellulose or animal or parchment membranes. Likewise, the colloidal particles will not settle out spontaneously from solution in short periods of time such as a day or so, although if the particles are several hundred millimicrons in diameter, and have a specific gravity much higher than that of the medium, they will gradually settle over a period of a few months.

As with the substrate, the colloidal particles in the coating should be in the solid state, as contrasted to the gaseous or liquid state; but plastic particles will be understood to be included as being in the solid state.

The colloidal particles in any particular monolayer are like each other but are different from the particles in an adjacent monolayer. The alikeness of particles in each monolayer has reference mainly to their surface characteristics and especially their surface electrical charge. Ordinarily, they will be alike in chemical composition and similar in size and shape. In a preferred aspect this size and shape will be substantially uniform. The difference between the colloidal particles in one monolayer and an adjacent monolayer again has reference mainly to their characteristic electric charge. Thus, if the particles in the first monolayer on the substrate are negatively charged as they exist in the coating dispersion, the particles in the second layer will be positively charged. To achieve such a difference the chemical composition of the second layer will be different from that of the first although it will be understood that a surface treatment to change the surface on the particles, such as coating silica particles with alumina to change the charge from negative to positive, is all that is required. For clarity of illustration, adjacent monolayers in the coating have been shown in the drawings as being of different size and shape, but it will be understood that the size and shape of the particles in the adjacent monolayers can be substantially identical provided their chemical constitution is sufficiently different to provide the required difference in electrical charge.

The first monolayer of colloidal particles is irreversibly joined to the substrate and the particles in each succeeding monolayer after the first are irreversibly joined to the monolayer below them. By "irreversibly joined" is meant that the particles do not spontaneously dissociate themselves from the surface to which they are joined, even in the presence of the dispersion medium from which they were deposited. The nature of the bond between the colloidal particles in the substrate or between succeeding monolayers of colloidal particles may consist of primary or secondary valence bonds or may simply be electrophoretic attraction, or may consist of all three of these bonding forces. Sufficient bonding is achieved if, when the substrate or coated substrate is brought into contact with a dispersion of the colloidal particles, the colloidal particles in the dispersion are deposited from the dispersion, as illustrated, for instance, in FIGURE 1.

As noted above the thickness of a multilayer film of this invention must be at least about 0.1 micron in order to show anti-reflecting and color-interference effects that are of practical value. While there is no theoretical upper limit to the film thickness that might be built up, given sufficient time and patience, it is generally found that it is not practical to exceed a layer of about 10 microns in thickness because of the length of the process and the probability of mistakes or accidents which create imperfections in the film during the deposition of the many layers. In building up multilayers consisting of colloidal particles, for example, 0.1 micron in average diameter, it will require 100 layers to be laid down individually in order to achieve a film thickness of 10 microns. To build up a film thickness of 10 microns more rapidly, particles of 0.5 micron or larger in size might be employed, but in this case, the adhesion of these large particles to the surface is relatively poor, and the particles tend to be removed during the rinsing process.

Composition-wise, the colloidal particles in the coating may be organic or inorganic and may consist of any substance which can be reduced to a colloidal state of subdivision wherein the particles have surfaces bearing ionic charges. The colloidal particles must be dispersible in a liquid medium as a colloidal dispersion. The chemical composition of typical colloidal particles will now be given, but it will be understood that this is for purposes of illustration only and is not limiting.

Aqueous sols of amorphous silica, aluminosilicate, including colloidal clays, such as montmorillonite, colloidal kaolin, attapulgite, and hectorite, may be employed as negatively charged particles. Colloidal dispersions of metal oxides having a positive charge may be dispersions of aluminum oxide, chromium oxide, iron oxide, nickel hydroxide, cobalt oxide, thorium oxide, zinc hydroxide, magnesium hydroxide, vanadium pentoxide, manganese oxide, niobium oxide, cadmium hydroxide, uranium oxide, copper oxide and hydroxide, water-insoluble higher oxides of chromium such as chromium dioxide, and in fact all water-insoluble metal oxides. It will be understood that "metal oxides" is intended to include the so-called colloidal hydrous oxides. The colloidal particles alternatively may consist of metal sulfides such as those of nickel, copper, iron, cobalt, silver, zinc, cadmium, mercury, and the like.

In making dispersions of some of these oxides it may be necessary to use conventional protective colloids to keep the particles in suspension, and in this case the charge on the particles will depend upon the charge of the protective agent which is adsorbed on the surface of the particles. When gelatin is used as the protective colloid, for example, it will act amphoterically in that it will act either as a positive colloid or a negative colloid. In gelatin-protected colloidal dispersions, from which excess gelatin has been removed so that only the gelatin remains that is attached to the discrete particles, the gelatin-coated particles will adhere, for example, either to an aluminum oxide layer or to a colloidal silica layer.

Among the organic colloidal particles which are suitable are colloidal carbon and colloidal graphite. These particles will ordinarily be found to bear a negative charge in aqueous dispersion. Certain natural gums, such as alginates, pectins, and galactans, are colloidal in nature and may be used.

Organic polymers such as the gums, natural latex and artificial latices consisting of more or less spherical dispersed particles of insoluble organic polymers, as well as proteins, elastomers, synthetic polymers, and synthetic condensation products can be employed if suitably dispersible. However, some of these polymers tend to form gels or coacervates in dispersions, the particles of which grow outside of colloidal limits. Such gels or coacervates are obviously not suitable in processes of the present invention.

The organic colloids used in this inveniton may be either positively or negatively charged or they may be amphoteric. Water-soluble polymers such as pectins or polygalacturonic acid, containing carboxyl groups, can form anions in solution and are therefore negatively charged. Similarly, hydrolyzed polyacrylonitrile and polyacrylic acid are negatively charged as are solutions of copolymers of styrene and maleic anhydride which, when dissolved in alkali, form acidic groups. Water-insoluble organic polymers which are dispersed as colloidal particles with soaps or other anionic dispersing agents are likewise negatively charged. Most synthetic elastomer latices, such as polystyrene latex, contain negatively charged particles.

There are some synthetic latices made with cationic dispersing agents which are positively charged. In this case, the organic polymer particles are generally spherical in nature, and are dispersed with organic surface-active agents containing amino groups or quaternary ammonium ions which provide the positive charge on the surface of the particles. A variety of colloid cations in which the colloidal particles have positive changes and colloid anions in which the colloidal particles have negative charges are discussed by H. R. Kruyt in Colloid Science, volume 2, page 338 et seq. (Elsevier Publishing Co., Inc., New York, 1949). Gum arabic, for instance, is classified as a colloid anion, whereas at low pH, gelatin is classified as a colloid cation.

Proteins, being amphoteric, will have a positive or negative charge at a given pH, depending on their isoelectric points. Thus, ichthyocoll is a protein which is positive at about pH 3. Films of single inorganic material can be formed by alternating one type of inorganic particle with organic particles of opposite charge and then burning out the organic. Linear organic polymers are particularly useful as colloidal particles for forming intermediate layers between layers of inorganic colloid particles laid down in the multiple film. When it is desired to build up a multiple layer of alumina particles of exactly controlled thickness, for example, a linear polycarboxylic acid such as polymethacrylic acid in the form of colloidal particles is used as the intermediate negatively charged layer to hold the positive alumina layers together on the surface. The organic material can later be burned out, if desired, leaving a pure aluminum film of exactly controlled thickness. The linear organic polymer is particularly effective because it can lie with its chains parallel to the surface, and thus a relatively small weight of organic polymer can cover a relatively large area and the organic intermediate layer is extremely thin, amounting to only a few Angstroms. When this layer is burned out its loss does not seriously disturb the layer structure of the alumina colloid.

Similarly, linear cationic organic polymers are useful in multiple layer silica coatings on a substrate. In particular, a linear polyacrylate bearing quaternary ammonium ions attached to side chains is highly effective. A product of this type can be made by polymerizing N,N-diethylaminoethyl methacrylate and then quaternizing the tertiary amino groups with dimethyl sulfate to form quaternary N-methyl-N,N-diethylaminoethyl groups as cations on the polymer chain. Many other types of high molecular weight polyamines will function in a suitable manner.

Films can be constructed in which both positive and negative layers of colloidal materials are organics. For example, alternating layers of a colloidal anionic organic polymer such as a chlorosulfonated polyethylene and a colloidal cationic organic polymer such as polyacrylamide can be deposited on a smooth substrate to provide an extremely thin film of uniform thickness made up solely of organic polymers.

Very large organic colloidal units such as starch can be employed as the colloidal particles where exact control of the thickness of the multiple layers is not important. Some oxidized starches contain carboxylic groups, making the colloidal starch units negatively charged. On the other hand, a positively charged starch is sold commercially as "Cato." Inorganic polymers such as sodium polymetaphosphate may also function as the colloidal particles. These are usually chain-like colloidal units carrying a large number of negative ionic charges.

DEPOSITING THE COATING

The first step of a process of the present invention consists in effecting contact between the substrate and a dispersion of colloidal particles, both suitably selected as above described. Contact can be accomplished by immersing the substrate in the dispersion as shown in FIGURE 1, or by spraying the immersion onto the substrate, or by applying the immersion to the substrate by brushing or by means of a transfer roll, or by any other effective method.

It is to be noted that the colloidal dispersions employed in the processes of this invention are colloidal solutions or sols. They do not consist of aggregates of precipitates or gels formed from colloidal particles. In order to form single, uniform layers of colloidal particles by adsorption at the substrate surface, the particles must be separate and discrete, so that when one is adsorbed it does not hold a number of others. An apparent exception is in the case where a number of colloidal particles form crystals or aggregates which are still sufficiently small to be in the colloidal range, so that the aggregate may be still considered to be a single colloidal particle.

The colloidal particles must be irreversibly adsorbed on the substrate during the contacting step. Irreversible adsorption occurs when the charge on the particles is opposite to that on the substrate.

One convenient way to determine the charge on the surface of the substrate is to use indicator solutions of colloidal particles of known charge. These solutions contain particles which are of the order of 100 millimicrons in diameter or about a quarter of the wave length of visible light. Two relatively smooth surfaces on the substrate are selected, and one of these is wet by a test solution in which there are colloidally dispersed negative particles and the other is wet by a test solution in which there are colloidally dispersed positively charged particles. After standing a moment the test plates are rinsed and dried. When the charge on the surface of the substrate is opposite that of the test solution, the rinsed and dried surface appears darker or duller when observed by refracted light. The presence of colloidal particles on the surface can also be detected by making a replica of the surface and examining this with the electron microscope.

A negatively charged test solution for use as above described consists of a 3% solution of colloidal silica having a particle diameter of about 100 millimicrons. This can be prepared in accordance with U.S. Patent 2,574,902 and adjusted to a pH of about 4 with acetic acid. A solution of positively charged colloidal particles is prepared by diluting a cationic aqueous latex dispersion of polychloroprene elastomer particles to a sol concentration of about 5%.

For substrates which do not have a sufficiently large area of flat, smooth surface to give good test results, as for example, fine fibers or powders, the test for positive or negative character can be revised as follows. The substrate can be suspended in the test solution, then rinsed in water which has been adjusted with acetic acid or ammonia, as necessary, to the same pH as the test solution, until all of the rinse water is essentialy free from the colloidal test particles. The substrate is recovered from the aqueous suspension, dried, and analyzed. When silica is employed as the test solution, an increase in the silica content of the substrate indicates the adsorption of silica. When the polychloroprene test solution is used, analysis of the recovered substrates for increase in total chlorine content indicates the amount of polychloroprene adsorbed. With some very finely divided substrates small amounts of both the positive and negatively charged test materials may sometimes be found, but the one found in preponderance will indicate the nature of the surface.

Some surfaces are amphoteric and bear both positive and negative charges as already pointed out above with respect to proteins. These materials may be considered to be either positively or negatively charged and may be treated in accordance with the processes of this invention.

The medium in which the colloidal particles are dispersed in the initial step of a process of the invention is a liquid, preferably aqueous. It will be understood that the aqueous medium may contain stabilizers, pH control agents, and the like.

The quantity of colloidal dispersion applied to the substrate surface should be an amount containing at least a sufficient number of colloidal particles to cover the substrate to a depth of a single layer of colloidal particles. An excess, in the amount of 5% or more of this number of particles, is preferably used. Once it is realized that a complete monolayer is required, the calculation of the number of particles needed can readily be made from a consideration of the particle size of the colloid and the surface of the substrate.

The surface area of the substrate can be calculated in the case of a macroscopic object from the dimensions as observed directly, or can be calculated from the particle dimensions as observed by a microscope if the substrate is finely divided. For instance, if the substrate consists of a powder of cubic particles 100 microns measured along one edge, and if the density is 1.0 gram per cubic centimeter, one can estimate that one gram of the powder will have a surface area of 600 square centimeters. In applying spherical colloidal particles 10 millimicrons in diameter with a density of 2 grams per cubic centimeter as a monolayer to this surface, it may be assumed that the density of packing of particles in the layer is about 50% at most; thus, the weight of particles required will be $0.5 \times 600 \times 10 \times 10^{-7} \times 2$ or about $6 \times 10^{-4}$ grams of colloid. In order to treat the powder, a certain minimum volume of solution is required, ordinarily at least an equal weight. Thus, if 1 cubic centimeter of colloidal solution were employed, it would need to contain only $6 \times 10^{-4}$ grams of colloid or a concentration of only 0.06%. Similarly, to treat 600 square centimeters of the surface of a glass plate only 1 cubic centimeter of 0.06% colloidal solution would be needed.

It will be apparent that it is much easier to use a larger volume of solution than that needed to barely wet the surface of the substrate. Usually a much larger amount is used and the substrate is removed and the solution used again on another portion of substrate. However, the above type of calculation is useful in calculating the minimum *concentration* of colloidal solution to be used. One uses a concentration such that in the minimum volume of solution required to wet the surface of the substrate, there will be present enough colloidal particles to form a monolayer of particles on the surface. If the substrate is a powder, the volume of liquid required to wet the surface can be determined by adding liquid until the powder is uniformly moist. If the substrate is a sheet or film, it may be dipped in the solution, removed, and the increase in weight determined.

The concentrations of colloidal solutions employed will usually range from as low as 0.01% to as high as about 5%. The concentration depends to some extent on the size of the particles involved. For relatively large colloidal particles, the concentration employed for treating the surface is relatively high—of the order of several percent. Where the particles are extremely small and therefore, for a given weight concentration in solution, are present in extremely large numbers, the treating solution can be relatively dilute—for example, 0.1% or even in some cases 0.01%. Generally speaking, the more dilute the solution, the longer it should be permitted to remain on the surface so that the particles will find their way to the surface before the excess sol is removed by rinsing.

The thickness of the monolayer of particles should be assumed to be equal to that of the minimum particle dimension, i.e., thickness, if the particle is a platelet or rod, or diameter, if it is cubic or spherical. In all cases the packing density will be assumed to be 50%. If the layer consists of spherical particles 50 millimicrons in diameter, it will be assumed that the volume of colloidal material in a monolayer will be the same as if the layer were dense, non-porous and 25 millimicrons in thickness. It will be understood that somewhat less than this amount of colloid may be in a monolayer, but it will generally be at least half as much as estimated on the basis of 50% packing density.

The concentration of colloidal particles in each coating dispersion can be in the range of $nd\%$ by weight where $n$ is from 0.1 to 0.01 and $d$ is the number average of the smallest dimension of each particle.

The result of effecting contact between the colloidal dispersion and the substrate surface is to deposit upon the substrate a single layer of the particles. Where an excess of particles over that needed to produce a single layer is used there may be a double or even triple layer of particles on the surface, but the second and third layers are not adsorbed to the surface and are usually held only by a very loose bond; in any event, they are usually removable.

RINSING OFF EXCESS DISPERSION

After the first monolayer of colloidal particles is applied the excess of colloidal dispersion, if any, is rinsed off.

As the rinsing medium, there is used a liquid which removes any colloidal particles not directly adsorbed to the surface of the substrate but does not affect the monolayer. If the colloidal particles, for instance, were fibrous aluminum monohydrate having the boehmite crystal lattice, one would not use sodium hydroxide as the rinsing agent because this obviously would dissolve the adsorbed particles. Similarly, one would not use a solution of a very strong peptizing agent because this could redisperse the particles even though they are irreversibly adsorbed with respect to the colloidal solution from which they were originally laid down.

For most purposes water is an ideal rinsing agent and its use is hence preferred.

DEPOSITING ADDITIONAL COATINGS

Additional monolayer coatings are applied according to the processes of this invention as already described for the first deposition and rinsing steps, except that the colloidal particles in the second dispersion applied are particles which are irreversibly adsorbed on the first monolayer coating rather than on the substrate. Actually, such particles might not be adsorbed at all on the substrate. Generally, these second-applied particles will have a charge opposite the charge on the first monolayer particles and hence be deposited by electrophoretic attraction. The rinsing step is carried out as done after the original coating.

The deposition and rinsing steps are carried out still a third time to produce a product of the present invention. Again, in the third step, the charge on the particles will be the opposite of that on the particles in the second step. Indeed, the charge on the particles in the third monolayer will be identical with that on the first monolayer.

Additional monolayers can be applied as desired, following the techniques already described. Thus, the fourth layer may be identical with the second layer, the fifth with the third or first, and so on. As already mentioned, by using colloidal particles of relatively small size in multiple layers according to the invention, coatings of very accurately controlled thicknesses of particles can be deposited. An article showing five such deposited layers is illustrated in FIGURE 3.

PRECAUTIONS TO BE OBSERVED

The substrate to be employed in the novel processes must be thoroughly clean and preferably smooth from a microscopic standpoint.

It is important not to let the colloidal solution dry on the surface being treated before excess sol is removed. This is a very common source of difficulty in treating surfaces. The reason for this is that when a colloidal solution is dried on a surface, the colloidal particles come together and often coalesce or precipitate at the high concentration on the surface, leaving irregular masses or films wherever the surface has become dry. This leads to very irregular deposition and formation of films and coatings of highly irregular thickness.

Another common source of difficulty is the presence of impurities in the rinsing water employed. In working with some colloids this is not important, while with others, impurities such as sulfate in the rinse water can be very serious. The calcium ions and magnesium ions in hard water, for example, are often deleterious. Generally speaking, the sols should all be prepared in distilled or deionized water, and such purified water should be employed for all rinsing operations, unless it is shown that tap water can be used.

Another source of difficulty is uneven drying of the rinsed surface. Particularly when working with organic polymer particles such as latices, uneven rewetting of the surface prior to application of the next colloidal solution causes water-spotting. Apparently the organic polymer particles, such as polystyrene latex, are somewhat elastic, and furthermore, when dry, tend to become somewhat hydrophobic. When a drop of water strikes such a surface and is then permitted to dry, it disturbs the surface structure of the latex layer, and this can be seen to cause irregularities in the final film. Therefore, in drying, the surfaces should be drained uniformly and dried as uniformly as possible, and when re-immersed in a treating solution, immersion should be regular and uniform. This precaution is particularly important in making films of very uniform thickness for non-reflection purposes. Insolubilizing such sensitive films by heating to 150° C. before rewetting sometimes helps.

Usually, it is easier to obtain uniform multilayer films when inorganic colloidal particles are employed. When layers of inorganic oxide particles, for example, are dried, they seem to cement together spontaneously, so that the dried layers are much less prone to be disturbed by rewetting than in the case of layers of organic polymer molecules or latices. Inorganic particles are preferred in processes of this invention.

MECHANICS OF DEPOSITION

Although it will be apparent from the foregoing description that films can be built up according to the processes of this invention, a theoretical explanation of why a single layer of colloidal particles will remain on the surface while the excess is rinsed off may not be readily evident.

When a particle of colloidal size is brought to the surface of a substrate such as glass, it is anchored to the substrate by a large number of ionic charges and in this way differs from the adsorption of smaller ions which bear only one or at the most a few charges. Thus, when a colloidal particle of alumina bearing hundreds of positive charges on its surface comes in contact with glass, there is a large number of positive charges on the surface of the alumina particle which is brought into close relation to a similar number of negative charges on the glass surface. If, due to Brownian movement or mechanical action, the particle begins to be dislodged so that some of the charges are separated, there are still enough of them so that the over-all attraction remains.

When a surface treated with a sol is rinsed under running water, so as to remove the sol, all particles which are not directly anchored to the surface diffuse out into the stream of moving water and are carried away. During the rinsing operation, as the water flows past the surface of the solid, there is an essentially immobile boundary layer of water next to the surface which does not move. The thickness of this layer depends upon the velocity of the flow of water, but with ordinary laboratory manipulation such as rinsing, this static film of fluid is probably from a half a micron to a micron in thickness. It has been observed that when the particles at the surface are larger than about 500 millimicrons the flow of water during rinsing must be relatively gentle or it will dislodge some of the particles and take them away from the surface in spite of the ionic attraction. When the particles are 100 millimicrons in diameter, even rinsing with a very strong stream of water does not appear to detach the particles.

From the foregoing discussion it can be seen that when ionically charged particles are so small as to be considered ions, e.g., tripolyphosphate ions, they may not have enough charges to hold them permanently at the surface, while if the particles are above the colloidal range, they are rather easily swept away during the rinsing process. Thus it happens that particles in the colloidal size range are peculiarly suitable for building up thin films of known thickness.

While the foregoing explanation appears to fit the facts, it will be understood that other explanations may also apply and that the scope of the invention is not to be limited by this explanation but is defined only in the appended claims.

USES OF THE INVENTION

Films more than about 0.1 micron in thickness have the property of reducing the reflection of light, showing interference color in reflected light. Such films built up of alternate monolayers of inorganic particles such as colloidal alumina and colloidal silica can by hardened by treatment with small amounts of freshly hydrolyzed ethyl silicate or tetraisopropyl titanate, the amounts being insufficient to fill the pores between the colloidal particles in the film, but yet adequate to cement them together sufficiently to harden the film so that it will not easily rub off. Alternatively, these multiple films can be strengthened by heating the treated glass surface to a temperature 25 or 50 degrees below the softening point of the glass.

Temporary non-reflecting films can be obtained by building up alternate layers of cationic organic polymer and colloidal silica. Permanent coatings can be obtained by building up somewhat thicker layers and then burning out the organic polymer, so that the film collapses to the desired thickness for, say, maximum light interference. Also, temporary non-reflecting films can be made by treating the surface of glass with colloidal alumina, and then with polystyrene latex of uniform particle size. This material can be obtained in different particle sizes, and from 1 to 3 layers of polystyrene, alternated with colloidal alumina, will give low-reflecting films of hues ranging from bronze through dark blue to green.

This method of building up non-reflecting films on surfaces is highly advantageous over other available schemes because the thickness of the films is controlled entirely by the size of colloidal particles employed and the number of layers applied, and the film is of uniform thickness when applied over large sheets of glass, as well as on small areas. It can also be applied easily to curved surfaces and glass surfaces of unusual shapes. For example, it may be applied to the interior and exterior of the glass of television tubes.

By the techniques of this invention it is possible to apply extremely thin insulating layers to a conducting surface. Thus, onto a sheet of copper, which is normally covered with an extremely thin film of copper oxide and is thus positively charged in aqueous solution, alternate layers of silica and alumina can be applied. These layers can be reinforced with small amounts of hydrolyzed silicic or titanic esters and over this film can be applied a conducting layer, such as graphite or finely divided silver or platinum. While such layers can be punctured by the application of relatively low voltages, they are nevertheless of interest because of their very capacity. By properly applying suitable alternate layers of conductors such as graphite and non-conductors such as graphite and non-conductors such as alumina and silica, it is even possible to build up a multi-plate condenser, in which the dielectric film is only a few millionths of an inch in thickness.

The processes of this invention can be used to deposit ceramic oxides on the surface of metals which are to be exposed to elevated temperature. By building silica films, for example, to suitable thickness, the surface of copper, nickel, and stainless steel can be modified toward oxidation at high temperature, apparently by virtue of the fact that the metal oxide which is formed under the film interacts with the components of the film and forms an impermeable barrier toward further oxidation.

Essentially transparent, yet conducting, films of graphite can be laid down on glass, for example, by building up alternate layers of colloidal alumina and colloidal graphite on the surface of glass. Thus, pathways are provided for controlled leakage of surface charges. On other substrates, electronstatic charges can thus be dissipated.

Surfaces can be lubricated by the adsorption of colloidal graphite or colloidal metal soaps alternating with oppositely charged particles. Thus, metal and glass surfaces are lubricated by the application of extremely thin films of colloidal graphite, utilizing a suitable choice of alternating layers, as will be apparent from the preceding discussion.

Another extraordinary lubricating film can be applied, for example to the surface of glass, as follows: The glass surface is first coated with a layer of colloidal alumina particles, and then treated with a colloidal dispersion of "Teflon" fluorocarbon polymers consisting of particles about 200 millimicrons in diameter. Multiple layers of this type can be built up to insure adequate lubrication, and can be anchored in place by heating the film to the temperature required to sinter the Teflon particles together. A continuous film of Teflon is not formed, but rather a network layer of Teflon particles, which is adequate for lubricating purposes.

The deposition of metals such as silver, gold, or platinum from reducing solutions to form a mirror on glass can be profoundly modified by pretreating the surface of the glass with multiple films of colloidal particles. Various effects can be obtained, depending upon the nature of the particles, some of which minimize metal deposition, but in most cases the extraordinary internal surface area within the film promotes the deposition of the metal mirror and increases the adhesion and hardness of the mirror on the surface of the glass. Similarly, extremely thin films of graphite can be applied to non-conducting surfaces in this manner to provide a basis for the deposition of electroplated metals such as nickel and copper. It is possible in this manner to treat glass fabric and then electroplate it with copper, for example.

Certain metals such as copper, brass, and stainless steels develop colored oxide films when heated in air. Pretreatment of the surface with multiple layers of colloidal oxide modifies the colors of the films and permits the development of films of very uniform color when the surface-treated metal is heated at a suitably elevated temperature in air.

Very thin layers of magnetic particles only a few millionths of an inch thick and uniform in thickness can be built up on surfaces such as glass and certain organic polymers, starting with magnetic particles which are of uniform colloidal size. Generally, magnetic particles are found to be positively charged in aqueous solution, so that negatively charged colloids such as silica or anionic organic polymers are employed as the intermediate layers in building up multilayers of the magnetic material.

Semiconducting films of extremely uniform thickness can be built up on insulating materials by using colloidal particles of conducting or semiconducting materials. Thus, colloidal stannic oxide is deposited with alternating layers of colloidal alumina, and then subjected to a heat treatment in a reducing atmosphere to reduce the stannic oxide to stannous oxide. Such films are semiconducting. Colloidal platinum can be used instead of the stannic oxide to make conducting films.

Another type of conducting film can be built up on an insulating surface such as aluminum oxide, in which the colloidal particles in certain of the layers emit electrons in high vacuum and develop a space charge in the film. Thus, colloidal barium carbonate can be built up in the multilayer structure on the surface. However, in this case, a porous multilayer film of alumina applied with an anionic organic polymer, which is later burned out, can also be impregnated with barium acetate and reignited to deposit barium oxide within the film. This type of surface emits electrons in a vacuum at 400° C. and a type of pore-conductivity is developed.

In such films, the Hall effect is quite marked, and various electronic devices can be made, based on this phenomenon. For example, by applying suitable alternate layers of metallic conductors and non-conductors such as alternate layers of colloidal platinum and colloidal alumina, analogs of vacuum tubes can be constructed with one layer of platinum serving as the electron emitter, an intermediate layer of platinum serving as the screen grid, and the third layer of platinum acting as the plate. Because of the extremely small spacing, such a device operates at very low applied voltage on the plate, and if enclosed in a high vacuum, functions at room temperature with the platinum emitting electrons at ordinary temperature because of the extremely small spacing. In the construction of this device, the intermediate layer of colloidal platinum serving as the screen grid, is not laid down as a continuous layer, but the particles are admixed with some negative colloidal particles such as silica. These films are, of course, not continuous, but are full of pores between the adjacent particles in the layer, through which the electrons can flow from the cathode to the plate.

The techniques and compositions of this invention can be combined to advantage with techniques employing electron-beam-activated machining for making microelectronic devices. The latter techniques have been described by Kenneth R. Shoulders, SRI Project 2863, Contract NONR–2887 (00), Interim Scientific Report dated September 1960, "Research in Microelectronics Using Electron-Beam-Activated Machining Techniques," published by Stanford Research Institute, Menlo Park, Calif. On page 23 of this report, there is described a solid-state tunnel effect component in which only a metal and a dielectric are used. For the deposition of the dielectric, the technique for depositing colloidal particles on surfaces, as described in this invention, can be employed. Thus, on a ceramic substrate there can be first deposited a metal layer to serve as a cathode, then a porous layer consisting of two or more alternate layers of colloidal alumina and colloidal silica, on which is then superimposed a grid of platinized or otherwise metallized fibers of asbestos, glass, or potassium titanate having a diameter from 0.1 to 1 micron, forming an open network, then above this, additional spacing layers of colloidal silica and colloidal alumina, followed by a final layer of conducting particles to serve as the anode.

These components must be sintered together slightly to stabilize the structure and improve the adhesion between layers. The layers should be placed on a substrate having a coefficient of thermal expansion approximately equal to that of the layers, and the assembly should then be dehydrated under high vacuum at 200 to 300° C., fitted with suitable conducting leads, and encased in a vacuum in an envelope. Thus, the colloidal particles, forming layers which are porous due to the holes between the particles, provide a spacing for the conducting elements in the tunnel effect vacuum triode.

Another application for colloidal particles of controlled size and shape, applied to a surface according to the methods of this invention, is to make multiple tip cathodes of the shape described on page 35 of the report by Shoulders. Low-voltage operation of tunnel effect devices requires the presence of extremely fine metal tips from which the electrons can escape. The formation of these tips by electron-beam-activated machining techniques has been described by Shoulders. An alternative is the use of colloidal particles, according to the present invention, essentially as masking materials, or as submicroscopic molds for the formation of metal tips by electrodeposition.

The above-mentioned technique is carried out as follows: On a smooth metal surface there is first absorbed a layer of particles such as 100-millimicron, spherical particles of silica. If the metal surface is positively charged in aqueous solution at pH 3, a single layer of the particles will be adsorbed and excess silica can be rinsed off. Then, to ensure complete coverage of the surface with colloidal particles, a layer of colloidal alumina is deposited thereon, followed by another layer of colloidal silica. The spacings between the colloidal silica particles are of the order of 10 to 40 millimicrons; these spacings are somewhat irregular in shape but are similar to those that may be visualized by looking down on a table covered with three layers of billiard balls: if the balls are not regularly arranged, the spacings between them will be somewhat irregular, but will be of the same order of dimensions. This coating of three monolayers of colloidal particles, preferably applied to a film of platinum, can then be heated to 500° C. to sinter the alumina and silica particles together and anchor them to the metal surface. Then the back of the platinum and the edge of the surface is masked off with an insulating varnish and the surface is placed in an electro-plating bath and platinum is carefully deposited through the colloidal film onto the underlying platinum surface. While plating, it is necessary to control the current very carefully, to prevent the formation of bubbles which disrupt the colloidal particle layer. As plating progresses, the surface of the platinum appears to become black due to the present of fine platinum crystals being formed through the holes between the colloidal particles. This provides the innumerable fine points which will later be used as a multiple tip cathode.

Metals other than platinum can be used, but in this case it will be necessary to handle the coating in an inert atmosphere, since the deposited metal, being extremely finely divided, will oxidize readily. In general, it will not be necessary to remove the colloidal oxide particles from the surface, since they support the deposited metal and keep the projections from sintering. However, the oxide can be removed, for example, with caustic solution.

This technique can be employed to great advantage where the electronic device consists of extremly thin films which are macroscopic in area. For microelectronic devices, the area covered by each device can be of the order of only a micron or so, and the whole device can be no more than a few microns wide and a micron or so in thickness. On the other hand, it is possible by the present invention to deposit conducting an non-conducting layers of colloidal particles on considerably larger areas—say up to several centimeters square—yet where the elements are still at most only a few microns thick.

Where electron-beam machining is employed to create a large number of microelectric devices on a given surface, a layer of colloidal particles can also be employed as part of the structure, by the techniques of the present invention. The adsorption of layers of colloidal oxide particles, for example, can take the place of the deposition of oxide layers by vaporization under high vacuum, with the advantage of applying layers of exactly controlled thickness over the whole treated area.

Interference filters of a reflection type are made by applying very uniform alternate films of colloidal alumina and silica to the surface of Carerra glass. White light directed at this surface, if reflected at a specific angle, is found to exhibit a specific color representing a relatively narrow band of wavelength.

For the development of sharpest interference colors, of greatest intensity, an interference filter may be built up as follows: A substrate of polished metal, or of glass bearing a mirror of metal, is coated with multilayers of inorganic colloids to the desired thickness, i.e., about a quarter of the wavelength of visible light, and then a half-reflecting film of metal is applied. Without the final semireflecting film, the color of the reflected light is of low intensity. By equalizing the intensity of the light reflected from the bottom and top of the colloidal multilayer film, as by the insertion of suitable metal layers, intensity of color in the reflected light is greatly increased. The application of multilayer colloid film techniques of this invention to the manufacture of interference light filters of very narrow band widths will be apparent to one skilled in the art rom the foregoing disclosure, and said art being described by Vasicek in "Optics of Thin Films," Interscience Publishers, 1960.

The thickness of extremely small colloidal particles can be estimated by very simple techniques, based on the development of multiple films of other colloidal particles of known size. Thus, for example, if one applies to the surface of black Carerra glass a layer of collidal alumina fibrils 6 millimicrons in thickness, and then a layer of spherical amorphous silica particles 100 millimicrons in thickness, the resulting film, viewed in white light vertically, has a brownish or bronze color. Now if on a similar piece of black glass there is first deposited a layer of colloidal alumina and then a layer of spherical silica particles only 15 millimicrons in size, no film is visible. However, if over this one then applies a layer of colloidal alumina and a layer of 100-millimicron particles, the combined film does not appear to be brown, but blue. Thus, it is found that an underlying layer of 15-millimicron silica along with a layer of alumina changes the color of the 100-millimicron film by a certain amount. It is possible to set up a series of standards using known particles sizes in the underlying layers. Then if one has a solution of colloidal silica of unknown size, it is only necessary to apply this as the underlying film, and then apply it the 100-millimicron film (alternating with alumina) and compare the colors with the series of standards.

The thickness of protein molecules such as bovine albumen can also be estimated in a similar manner.

Extremely thin uniform films made up solely of alternating layers of oppositely charged colloidal organic materials can be employed as dielectrics in miniature capacitors. Such films may also be spread over a fine screen or plastic filament mesh which serves as a support, to provide an extremely thin membrane for carrying out separations by selective diffusion.

The porosity of the membrane may be varied by proper choice of the organic latex particles; the softer and more elastic particles are fused together during drying and heating to give a relatively impermeable membrane, whereas particles of less elastic, stiffer polymers may be fused together in the film only at their points of contact, to provide an array of extremely fine pores, the particle size of which may be regulated by proper choice of the size of the latex particles and the degree of coalescence during the sintering step.

The invention will be better understood by reference to the following illustrative examples.

Example 1

Plate glass was cleaned with alkaline cleaner and thoroughly rinsed. It was then dipped into a 0.1% solution of bovine albumen adjusted to a pH of 3 with hydrochloric acid. After agitating the glass in the solution for one minute, it was removed and immediately rinsed with distilled water to remove excess albumen. The glass was permitted to dry in air and then immersed in a 2% dispersion of 100-millimicron particles of colloidal silica, at a pH of 3, the previously alkali-stabilized sol being lowered to this pH by the addition of hydrochloric acid. After agitating the glass plate in the silica sol for three minutes, it was removed and the silica sol rinsed from the surface with distilled water. The glass plate was then dried. When viewed in reflected light against a dark background, a reddish-purple film was visible on the glass. When used as a cover for a picture, reflections from the glass were greatly reduced, and the picture was more readily visible.

To render the surface less readily affected by moisture, the silica-coated surface was then treated with a 0.2% solution of fibrillar colloidal boehmite having a pH of 4 in water, rinsed, and dried. It was then flooded with a 0.1% warm solution of sodium stearate and quickly rinsed and again dried. The coating consisted of three layers of colloidal material, two of the layers being inorganic.

Example 2

A non-reflecting coating on glass was prepared as in Example 1, except that a 2% dispersion of colloidal zirconia consisting of relatively uniform aggregates of particles, was employed in place of the bovine albumen. The aggregate colloidal particles of colloidal zirconia had an average particle size of about 25 millimicrons. The film had a brownish color when viewed in reflected light against a dark background. However, it had a slightly hazy appearance, due to the fact that the colloidal zirconia contained some aggregates as large as 50 millimicrons in diameter, so that a completely uniform, non-reflecting film was not obtained. However, the treated glass reflected noticeably less light than untreated glass.

To improve the visibility of the picture covered with this glass, the surface of the glass was further treated with a 3% solution of colloidal silica consisting of spherical particles about 30 millimicrons in diameter, and having a pH of 3. The excess colloidal silica sol was rinsed off with distilled water and the glass dried. When viewed against a dark background, the glass now exhibited a deep brownish-bronze color, and the amount of light reflected was greatly reduced.

To make the surface less readily affected by moisture, the silica-coated surface was treated with a 0.2% solution of fibrillar colloidal boehmite, rinsed, and dried, all as in Example 1. The final product had a coating of three monolayers of colloidal particles, all inorganic.

Example 3

Fiber glass cloth, heat treated to remove organic lubricants and impurities, was immersed in a 0.5% solution of fibrous colloidal boehmite as described in Bugosh Patent No. 2,915,475, said fibers having a particle diameter of about 6 millimicrons and a fiber length of about 120 millimicrons.

The treated fabric was then rinsed in distilled water to remove alumina sol. It was then air dried. A colloidal dispersion of graphite, known commercially as "Aquadag," consisting of negatively charged graphite particles of colloidal size, was diluted to 3% solids. The dry fiber glass fabric with its coating of a single layer of colloidal alumina was then immersed in the dispersion of graphite and agitated for fifteen minutes, after which it was rinsed in distilled water until the rinse water was clear. It was then air dried. The cloth was then treated with more of the colloidal alumina solution as before, rinsed, dried, and treated with colloidal graphite solution, rinsed, and dried. At this point the fabric had a slightly gray cast. Although the amount of graphite which appeared to be adsorbed was relatively small, the fabric was highly lubricated and felt much softer and more flexible than the untreated fabric.

It was necessary to rinse the fabric thoroughly to remove each of the colloidal treating solutions before proceeding to the next step; otherwise, colloidal alumina in excess of that required to coat the surface of the glass fibers is carried over into the colloidal graphite solution, the latter solution slowly flocculates and the precipitated graphite no longer penetrates the fabric to obtain the desired result. Likewise, free colloidal graphite not rinsed thoroughly from the fabric after the first treatment with graphite will contaminate the colloidal alumina and inactivate the solution. Rinsing of fibrous or porous materials is particularly important, and requires more care than in the case of smooth surfaces such as plate glass. However, if one is willing to tolerate degradation of the treating solutions, replacing them continually with fresh solution, and if excess precipitated colloidal graphite and alumina within the body of fabric is not undesirable, then very thorough rinsing is not essential. However, the treated fabric will be darker due to entrapped and precipitated colloidal graphite. Furthermore, the surface of the fabric will be irregularly stained with precipitated graphite.

The glass fibers treated in this manner were coated with four layers of colloidal particles consisting of colloidal alumina, colloidal graphite, colloidal alumina, and colloidal graphite.

Example 4

A sheet of chromium-plated steel was cleaned with a soft alkaline household scouring powder, rinsed in distilled water, and dried. The surface was difficult to wet with colloidal silica, although where it was wetted, a layer of silica appeared to adhere. To improve wetting, the chrome-plated surface was first rubbed with a 0.5% solution of colloidal alumina, rinsed in distilled water and dried. Then, a 2% solution of 100-millimicron-diameter colloidal silica particles was applied, the excess rinsed off and dried. The film of silica could be seen because of a visible color due to light interference. A colloidal dispersion of "Teflon" 30 fluorocarbon resin was diluted to 5% solids. The silica-coated, chromium-plated metal was then dipped in the diluted Teflon dispersion, drained, rinsed, and dried. Very little colloidal Teflon adhered to the silica-coated plate. Colloidal alumina was then applied, rinsed, and dried, after which treatment with Teflon, followed by rinsing, left a visible film of Teflon particles. The plate was then treated alternately six times with colloidal alumina and colloidal Teflon, rinsing and drying between each treatment. A milky film was visible on the surface. The sample was then heated at 400° C. in air for three minutes. The Teflon alumina coating was highly water repellent, very smooth, and had a faintly milky appearance. The treated surface had a slippery feel and was highly lubricated, as compared to the untreated surface.

Example 5

Clean copper surface was treated alternately with colloidal "Teflon" 30, as described in Example 4, and with colloidal alumina, rinsing after the application of each colloidal solution, and drying, before applying the next solution. Two layers of Teflon, alternating with colloidal alumina were thus applied. The coated metal was heated to 400° C. for three minutes in air. The uncoated metal surface along the upper edge, which had not received the treatment, was oxidized to a bluish color, while the coated area was oxidized to a reddish color, showing a difference in the oxidation rate. The Teflon-coated area was smooth and slippery to the touch and was repellent to both oil and water.

Example 6

Using fibrous colloidal boehmite as described in Example 1, at a concentration of 0.5%, and 2% dispersion of colloidal silica having a particle diameter of 100 millimicrons, a piece of chromium-plated steel was treated alternately with silica and colloidal alumina, rinsing, and drying between treatment with each sol. Since the surface of the chromium proved to be positively charged in the solution at pH 4, the colloidal silica was applied first, and then the colloidal alumina, followed by colloidal silica and colloidal alumina again, giving a total of four layers of inorganic particles. The coated metal was then dried and heated in air at 600° C. for thirty minutes. Before this heat treatment, a small strip across the end of the sample was rubbed free of the coating to provide an uncoated area as a control. The sample, after being heated at 600° C., was then heated to bright red heat for five minutes in a gas burner to try to oxidize the surface of the chromium. The uncoated area was oxidized to a brownish-purple color, but on the treated area the film turned to a bright, uniform color of gold, and no oxidation appeared to occur. Both before and after the treatment, the silica-alumina film was clearly visible on the surface of the chromium when viewed at an angle of about 5 to 10 degrees incident to the surface, the reflected light showing brilliant red, blue and green colors, depending on the viewing angle. After the heat treatment, the film appeared to be quite adherent and resistant to rubbing off with a polishing cloth.

Example 7

A sheet of freshly split muscovite mica was treated with alternate layers of colloidal fibrous alumina and 100-millimicron colloidal silica as in Example 6. Four layers each of colloidal alumina and colloidal silica were deposited. A small strip at one end of the mica plate was not treated. The mica plate was then rinsed with a 2% solution of stannous chloride containing sufficient hydrochloric acid to maintain a clear solution. Next the stannous chloride solution was thoroughly rinsed off. A solution containing 0.1% gold chloride and 0.5% hydroxylamine hydrochloride was freshly mixed in a waxed container. The mica sheet was then immersed in this solution and almost immediately the mica surface which was covered with the silica-alumina multilayers turned dark purple in color, and gold rapidly deposited until a gold mirror was formed. On the untreated area, the deposition of gold was much less rapid and only a faint mirror appeared. After rinsing and drying, the gold-plated area of the mica was purple in transmitted light and gold colored in reflected light.

Example 8

Thoroughly cleaned and bright sheets of copper, brass and aluminum were coated with colloidal oxide layers, alternating ten layers of colloidal alumina (fibrous boehmite) with ten layers of 100-millimicron silica particles. These layers were applied as in the preceding examples, from a 0.5% colloidal alumina solution and a 2% colloidal silica solution, rinsing off the excess of each colloidal solution and drying before application of the next one. Along the edge of each metal sheet there was a strip lift untreated for comparison. After final rinsing and drying, these sheets were heated to 500° C. for a short period of time in air, and the surface oxidation observed as follows:

The copper sheet was heated one minute of 500° C.; the treated area was a smooth, uniform, bright red-orange in color, while the untreated area was covered with a heavy black layer of copper oxide which flaked off when the sample cooled.

The sheet of brass was heated for five minutes at 500° C.; upon cooling the treated area was still a bright yellow color, while the untreated area developed blue and red zones of surface oxidation products.

The alumina sheet was heated for ten minutes at 500° C. The treated area was a slightly dull white in color, while the uncoated area was smooth and shiny. In this case, the naturally protective aluminum oxide film on aluminum appeared to be even smoother than the area previously covered with the alumina-silica film. However, the alumina-silica film appeared to be thicker and still adherent.

Example 9

Microscopic glass beads 25 microns in diameter were heated in air for three hours at 450° C., then treated with a mixture of ten parts of chromium trioxide dissolved in 20 parts of sulfuric acid, and heated one hour, at 100° C., to remove all organic matter, thoroughly washed and dried. The beads were then stirred in a 0.5% solution of fibrous colloidal boehmite alumina, rinsed, then stirred in a 1% dispersion of 100-millimicron colloidal silica, rinsed and the alternate treatments with colloidal alumina and colloidal silica again repeated, followed finally with treatment with colloidal alumina. The beads were then rinsed. By this treatment, the surface of the beads was increased by a submicroscopic, highly porous multilayer coating of colloidal particle monolayers, and the ion exchange capacity of the surface of the beads was increased.

Example 10

A 30% solution of colloidal silica containing particles having an average particle diameter of 100 millimicrons, and containing no more than 5% by weight of the silica in the form of particles smaller than 50 millimicrons or more than 5% in the form of particles larger than 100 millimicrons, was diluted to a concentration of 0.5%. Separately, a dispersion of colloidal alumina in the form of fibrils 300 millimicrons thick and approximately 4 millimicrons wide was prepared at a solids concentration of 0.5%. The preparation of colloidal alumina of this type is disclosed in U.S. Patent 2,915,475.

A low-reflecting film was prepared on plate glass in the following manner: First, the glass was scoured with a household cleansing powder containing diatomaceous earth and a synthetic anionic detergent. It was then sponged and rinsed thoroughly with warm water and wiped with a clean, dry cellulose tissue. Both sides of the glass were cleaned in this manner. Immediately thereafter, both sides of the glass were sponged with the dilute colloidal alumina. Without permitting the colloidal alumina solution on the surface of the glass to dry, the excess alumina was rinsed off with distilled water. The glass was then permitted to drain in a vertical position, and to dry.

As soon as both surfaces of the glass were dry, both surfaces were sprayed with the dilute silica sol containing particles having an average diameter of 100 millimicrons. After both sides of the glass had been thoroughly sprayed with the silica, without permitting any of the area of the glass to dry, the excess silica sol was rinsed off in a stream of distilled water. The glass was then permitted to drain and dry.

Immediately upon being dried, the glass exhibited a dark, bluish appearance in reflected light. The amount of light reflected was less than 10% of that reflected from similar glass without treatment. The glass was employed in framing a photograph. Due to the fact that there was little light reflected, the glass was essentially invisible, and the photograph could be viewed without annoying reflections. A glass similarly treated was heated to 25° C. below its softening point for five minutes and slowly cooled. The low-reflecting film was hard and adherent.

Instead of hardening the film by baking at high temperature, the film was improved in durability by further application of three alternate layers of colloidal alumina of the type described above, and of colloidal silica consisting of particles 7 millimicrons in diameter. This deepened the color of the film somewhat. After immersing the coated plate in boiling water for one hour, the adhesion and abrasion resistance of the film was found to be improved over the original film which consisted only of a single layer of colloidal alumina and a single layer of 100-millimicrons silica particles.

Example 11

A piece of plate glass was treated as in Example 10. After the low-reflecting coating had been applied and observed to be uniform, both surfaces of the glass were sprayed with a solution containing 0.2% solution of waterglass or sodium silicate having an $SiO_2/Na_2O$ ratio by weight of 3.25, the concentration being expressed as the total solids content of $SiO_2$ and $Na_2O$. This dilute solution was permitted to drain thoroughly while holding the glass in an upright position, and then dried. The coating so applied was much more adherent and not removed when the surface of the glass was rubbed with a cloth.

In order to make the surface hydrophobic, it was finally treated with a solution of colloidal alumina to apply another layer of alumina, and after rinsing and drying, finally with a 0.1% solution of sodium stearate, followed by rinsing and drying.

Example 12

This is an example of the preparation of a low-reflecting film made with, as the negative colloid, a polystyrene latex of very uniform particle size. The particular polystyrene latex employed is commonly known as "Dow Polystyrene Latex," having a particle diameter of 88 millimicrons. The organic polymer concentration of the latex was about 30% by weight. This latex was diluted to a solids concentration of 3% before use.

Colloidal alumina as described in Example 10 was used as the positive colloid. A glass camera lens was thoroughly cleaned so that a water film on the surface would not draw up into beads, but remained smoothly spread. The lens was then dried and dipped in the colloidal alumina solution for one minute with gentle agitation, removed and rinsed with distilled water. The lens which now bore the alumina upon its surface was next immersed in the dilute solution of the aforementioned polystyrene latex. The lens was not dried after the excess alumina solution was rinsed off. The lens was then kept in the dilute polystyrene latex solution for five minutes with continuous gentle agitation. It was then removed without touching the surface of the lens, but only the edges, and rinsed in clear water. The lens was then placed on its edge and permitted to drain and dry.

The film of polystyrene latex made the surface somewhat hydrophobic, and the water film drew back quickly on the surface, leaving it almost dry. Both surfaces of the lens were observed in reflected light to be coated with a brownish or bronze colored film, which reflected much less light than did the lens before it was treated. The treated lens was then warmed in an oven to 60° C. for fifteen minutes, to render the coating less subject to removal by accidental rubbing.

To convert this film to one that was resistant to high temperature, it was further hardened by impregnation with a 0.1% solution of tetrabutyl titanate in toluene, followed by draining and drying, then by the application of two further layers of fibrillar colloidal alumina of 5-millimicron particle diameter, and colloidal silica of 7-millimicron particle diameter. This multiple coating was then baked on the glass by heating it slowly over a period of one hour to 150° C., then over another hour to 250° C., and finally to 450° C. It was then permitted to cool very slowly. In this process, the polystyrene burned out, leaving a layer of holes. The film took on a slightly hazy appearance, but the amount of light reflected from the surface was still much less than that of coated glass.

Example 13

A table top of black Carerra glass, having a highly polished surface, was cleaned with non-scratching household cleansing powder and thoroughly washed with clean water with a sponge, then wiped dry with clean cellulose tissue. The surface was then flooded with dilute 0.5% colloidal alumina as described in Example 1, permitted to stand for one minute, the excess solution then being drained off by tilting the table and rinsing with a stream of water. The surface was permitted to drain and dry. Then the surface was placed again in a level position and flooded with a 1% solution of colloidal silica having an average particle diameter of 90 millimicrons, without permitting any portion of the surface to dry. After standing two minutes, the excess colloidal silica which had not been adsorbed on the colloidal alumina was rinsed off with water, and then the surface placed in a vertical position and permitted to drain and dry. The treated surface reflected much less light, and had a pleasing dark bronze or yellowish-brown appearance in reflected white light.

Selected portions of the surface were then flooded with boehmite solution as in the earlier treatment, and the excess then removed by rinsing in such a direction that the colloidal boehmite alumina was not transferred to adjacent areas. The selected areas so treated were rinsed, drained and dried, and the whole surface then flooded with dilute 100-millimicron silica sol as before, permitted to stand for two minutes without drying, and then the excess colloidal silica was washed away and the surface permitted to drain and dry. The areas which had been treated for the second time with the colloidal alumina and then silica now had a purplish-red appearance in reflected light, while the areas which had not been treated the second time with mordant did not pick up any more silica and remained a brownish-yellow color.

Portions of the area which had received the second coat of silica were then treated for a third time with colloidal alumina and then after removal of the excess colloidal alumina, with colloidal silica. Excess silica was removed and the surface dried. In these areas, there were apparently three layers of silica particles and the color in reflected light was a deep blue.

By similar, repeated treatment of selected areas of the surface, other colors were produced. For example, five layers of silica, held together with alternate layers of alumina, were golden yellow when viewed almost vertically in reflected light. Six layers were orange; seven layers wer reddish-purple; eight layers were light blue; nine layers were yellowish-green; ten were almost orange; and eleven, mauve. The colors observed depended upon the angle of reflection and the aforementioned colors were observed by viewing the treated table top in a direction normal to the surface; the light was daylight from the northern sky. The general appearance was a brilliant, uniform irridescence, somewhat resembling mother-of-pearl or the colors in black opal and the colors changed with the angle of reflection.

The coating was then hardened by treating it with an aqueous-alcohol solution of hydrolyzed ethyl silicate (hydrolysis catalyzed by dilute HCl) having a silica concentration of 0.2%. This dilute silicic acid solution was flooded over the surface and then the surface held in a vertical position to permit it to drain, without further rinsing, and allowed to dry. After aging for several days, the finish was sufficiently hard that it was not removable by ordinary washing with soap and water.

Example 14

A two-inch by two-inch square piece of black Carerra glass was treated with three layers of 100-millimicron colloidal silica, alternated with colloidal boehmite as in the previous example. The treated surface acted as an interference light filter.

Example 15

Interference reflection light filters were prepared with a varying number of layers of 100-millimicron silica, alternated with colloidal alumina as in the previous example, and the relative reflectance determined with light of different wavelengths. Two layers gave maximum reflectance with light of a wavelength of 450 millimicrons (bluish), three layers gave a maximum at 560 millimicrons (yellowish-green), four layers at 625 millimicrons (reddish-orange).

The surface of glass which was to be metallized was treated with two layers of fibrillar colloidal boehmite, having a particle diameter of about 5 millimicrons, and spherical colloidal silica having a particle diameter of 30 millimicrons. This gave a multiple layer coating consisting of six layers of colloidal particles, which showed reduced reflectivity of light. This coating was then baked on the glass by heating the glass over a period of three hours to a temperature of 450° C., followed by cooling. A thin film of platinum was now applied by the vaporization of platinum from a tungsten filament in high vacuum, the surface of the glass being heated during this process to a temperature at 300° C. The platinum coating was much more adherent on the glass surface which bore the multilayer film of colloidal particles than it was to the untreated smooth glass surface.

Example 16

The following example illustrates the preparation of a brilliantly colored reflecting film by a process of the invention:

A piece of black Carerra plate glass was scoured and cleaned with a non-abrasive household cleansing powder, rinsed thoroughly with distilled water, and dried with clean, absorbent paper. Alternate layers of colloidal alumina and colloidal silica were applied using, first, a 0.3% solution of colloidal alumina consisting of fibrils 5 millimicrons in diameter and 200 millimicrons long (U.S. Patent 2,915,475), the sol having a pH of 4.2. The colloidal silica had a particle diameter $D_S$ of 70 millimicrons, calculated from specific surface area as described in "Colloid Chemistry of Silica and Silicates," by R. K. Iler, Cornell Press, Ithaca, N.Y. (1955), pages 103–106. This sol contained 3% $SiO_2$ and was adjusted to pH 3 with dilute hydrochloric acid. The coated glass was rinsed and dried after each application of a colloidal solution.

Spectrophotometric curves of reflected light of a range of wavelengths were obtained by diverting the light beams of a double-beamed Cary Spectrophotometer, Model No. 14, using mirrors, so as to divert the beam to the surface of the black glass plate, thence reflected to another mirror and thence to the photoelectric cell. The reference beam was similarly reflected from an uncoated black glass plate, while the measuring beam was reflected from a black glass plate which had been coated by the above procedure, with the indicated number of layers of colloidal particles. The incident beam struck the glass at an angle of 20 degrees from the normal to the surface.

A spectrophotometric curve was obtained for black glass which was coated with five layers of alumina alternating with five layers of colloidal silica. From the wavelengths for minimum adsorption and maximum adsorption, the thickness of the interference layer can be calculated from the formulae given below, where $t$=film thickness, L=wavelength, $a$=angle between incident beam and a normal to the glass, $n_1$=refractive index of film, and $m$ is a positive integer:

Minimum intensity of reflected light occurs at wavelengths where $$t = \frac{(2m-1)L}{4n_1} (\cos a)$$

The value of cos 20° is 0.94.

Maximum intensity occurs at wavelengths $$t = \frac{2mL}{4n_1} (\cos a)$$

Thus, with a refractive index of the film of 1.25, minima occur at $l$=5.3$t$, 1.78$t$, 1.06$t$, 0.76$t$, etc., and maxima occur at L=2.7$t$, 1.35$t$, 0.89$t$, 0.66$t$, etc.

The refractive index of the multilayered film was estimated from the known composition as follows:

The packing density of spherical particles is about 50% by volume, and similarly the packing density of alumina is around 50%. The refractive index of amorphous silica is 1.46 and that of the colloidal boehmite is about 1.58. Assuming the over-all refractive index of the film is between that of air and solid components in proportion to their volumes, the over-all value of the refractive index is about 1.25.

Minima in reflectivity were found at L=2120, 700, 430, 310, 235.

Maxima in reflectivity were found at wavelengths L= 1040, 530, 355, 265 millimicrons.

The thickness of the multilayer film calculated from these maxima and minima wavelengths averaged 400 millimicrons. This compared reasonably well with a thickness of 375 millimicrons calculated from 5 layers of alumina particles 5 millimicrons in thickness, and five layers of silica particles 70 millimicrons in thickness.

When the plate bearing the above-described film was observed in white light reflected almost vertically from the surface, it appeared to be chartreuse in color; at 45 degrees it was purple.

Example 17

The formation of extremely thin films of uniform thickness of organic polymers on a smooth solid substrate is exemplified as follows:

A strip of aluminum foil is wetted by being moistened with a colloidal dispersion of boehmite and the excess colloidal alumina rinsed off and the surface dried in a blast of warm air. The surface is then wetted with a colloidal anionic aqueous dispersion of a chlorosulfonated polyethylene (CP) having a particle size of about 0.1 micron, and the unadsorbed latex particles rinsed off, and the surface again dried. The surface is then wetted with a 0.5% aqueous dispersion of a cationic acrylamide polymer, sold by the Hercules Powder Company under the trade name of "Reten" 205. After rinsing off the excess of the latter material and drying the surface, the surface is again wetted with the anionic dispersion, the excess rinsed off and the surface dried. Subsequent similar treatments in turn are made with cationic dispersion of "Reten" 205, then with an anionic dispersion of polystyrene latex (Dow LSO-55A) with particle diameter of 188 millimicrons, "Reten," CP, "Reten," CP, "Reten," polystyrene, "Reten" and CP.

During this series of treatments, the presence of a thin film of increasing thickness can be observed in reflected light as indicated by changing interference colors. To insolubilize the organic film, it is then heated to about 125° C. for 2 minutes, and then to remove the film from the aluminum, the foil is immersed in 4% aqueous solution of sodium hydroxide. By this treatment the film is loosened from the metal and is transferred from the alkali solution to the surface of a sheet of glass, where it is spread out, washed with distilled water, and permitted to dry.

The film is transparent, but its presence can be detected on the surface of the glass when observed in reflected light, the intensity of reflection being less in the area coated by the film.

I claim:
1. In a process for depositing a plurality of monolayers of uniform, solid-state colloidal particles on the surface of a substrate in the solid state the steps comprising
   (1) effecting contact between the surface of the substrate and a first dispersion of colloidal particles which are irreversibly adsorbable on the substrate, the number of particles in a dispersion being at least sufficient to cover the surface, whereby the surface is coated with a single layer of the particles,
   (2) rinsing off any excess dispersion,

(3) effecting contact between the so-coated surface and a second dispersion of colloidal particles different from the first particles which second particles are irreversibly adsorbable on said coated surface, the number of particles in the dispersion being at least sufficient to cover the coated surface, whereby said surface is coated with a single layer of the second particles, (4) rinsing off and any excess of the second dispersion of colloidal particles, (5) effecting contact between the product of step (4) and a third dispersion of colloidal particles different from the second particles, said third particles being irreversibly adsorbable on the monolayer of second particles, the number of particles in the dispersion being at least sufficient to cover the coated surface from step (4), whereby the said surface is coated with a single layer of the third particles, and (6) rinsing off any excess of the third dispersion.

2. A process of claim 1 in which the dispersions of colloidal particles are dispersions in water and the product is dried after the final rinse.

3. A process of claim 1 in which the coated product is dried after each rinse step before applying the next coating.

4. A process of claim 1 in which the contacting and rinsing steps are repeated, in each contacting step the colloidal particles being different from the last applied particles and being irreversibly adsorbable on the last previously applied layer or particles, until a predetermined total thickness of applied coating is reached.

5. A process of claim 1 in which the colloidal particles in each coating dispersion are substantially uniform in size and shape, the uniformity being such that 90% of the particles have lengths, breadths, and thickness of from .5 to 2.0 times the respective number average lengths, breadths, and thicknesses of all the particles in the dispersion.

6. A process according to claim 1 wherin every alternate single layer of colloidal particles is an organic material.

7. A process according to claim 1 wherein the contacting and rinsing steps are repeated alternating between inorganic and organic monolayers until a predetermined total thickness of applied coating is reached, followed by burning out of the organic interlayers to form a film of a single inorganic material.

8. A process according to claim 7 wherein said solid-state substrate is glass and said inorganic material is colloidal silica.

9. An article comprising a solid-state substrate to a surface of which there is irreversibly joined a coating comprising at least three monolayers of colloidal, solid-state particles, the colloidal particles comprising each monolayer being alike and being different from the colloidal particles in an adjacent monolayer.

10. An article of claim 9 in which the colloidal particles in at least one of the monolayers are inorganic.

11. An article of claim 9 in which the colloidal particles in at least one of the monolayers are a water-insoluble colloidal oxide.

12. An article of claim 9 in which the colloidal particles in each monolayer are substantially uniform in size and shape, the uniformity being such that 90% of the particles have lengths, breadths, and thicknesses of from .5 to 2.0 times the respective number average lenghts, breadths, and thicknesses of all the particles in that monolayer.

13. An article of claim 9 wherein all of the monolayers consist of organic colloidal particles.

14. An article of claim 9 wherein the thickness of the coating is greater than about 0.1 micron but less than about 10 microns.

15. An article of claim 9 in which at least two of the monolayers consist of inorganic particles selected from the group consisting of amorphous silica, alumino-silicates, water-insoluble metal oxides and metal sulfides.

16. An article of claim 15 in which all of the monolayers consist of inorganic particles.

17. An article of claim 15 in which monolayers of a single colloidal inorganic material are alternated with one or more monolayers of an organic material.

18. An article comprising a solid-state substrate which is a refractory material having a melting point above 500° C., to a surface of which there is irreversibly joined a coating comprising at least there monolayers of colloidal, solid-state particles, the colloidal particles comprising each monolayer being alike and being different from the colloidal particles in an adjacent monolayer.

19. An article of claim 18 in which the coated, solid-state substrate surface is a planar glass surface.

20. An article of claim 18 in which the substrate is a metal.

21. An article comprising a solid-state substrate in the form of a body having one dimension very much smaller that at least one of the other two dimensions, to a surface of which there is irreversibly joined a coating comprising at least three monolayers of colloidal, solid-state particles, the colloidal particles comprising each monolayer being alike and being different from the colloidal particles in an adjacent monolayer.

22. An article comprising a solid-state substrate to a surface of which there is irreversibly joined a porous coating comprising at least three monolayers of colloidal, solid-state particles wherein the particles in each monolayer are alike.

23. An article according to claim 22 wherein said solid-state substrate is glass and said coating is colloidal silica particles.

24. An article according to claim 22 wherein said solid-state substrate comprises glass beads and said coating comprises at least three monolayers of colloidal silica particles.

25. An article comprising a non-porous optically smooth substrate selected from the group consisting of glass, porcelain, high alumina ceramics, organic films, and metals, said substrate having a planar surface to which there is irreversibly joined a coating comprising at least 3 monolayers of colloidal, solid-state particles, the colloidal particles comprising each monolayer being alike and being different from the colloidal particles in an adjacent monolayer, said coating being at least about 0.1 micron in thickness and showing interference colors in reflected light.

References Cited

UNITED STATES PATENTS

| | | | |
|---|---|---|---|
| 2,232,539 | 2/1941 | Langmuir | 117—69 X |
| 2,531,445 | 11/1950 | Laylock | 117—69 X |
| 2,644,771 | 7/1953 | Kempthorne | 117—72 X |
| 2,754,224 | 7/1956 | Caroselli. | |
| 2,915,475 | 12/1959 | Bugosh | 252—313 |
| 2,977,245 | 3/1961 | Yun Jen | 117—72 |
| 2,983,625 | 5/1961 | Schappel | 117—76 |
| 3,013,901 | 12/1961 | Bugosh | 117—72 |
| 3,013,902 | 12/1961 | Bugosh | 117—76 |
| 3,013,903 | 12/1961 | Bugosh | 117—76 |
| 3,265,629 | 8/1966 | Jensen | 117—81 |
| 2,913,419 | 11/1959 | Alexander. | |

RALPH S. KENDALL, Primary Examiner

J. A. BELL, Assistant Examiner

U.S. Cl. X.R.

117—70, 72, 75, 76, 81, 82, 91, 215, 216, 217